May 9, 1939. M. BESSONNEAU 2,157,783
FOLDING HOOD FOR AUTOMOBILE VEHICLES OR THE LIKE
Filed Nov. 16, 1938 3 Sheets-Sheet 2
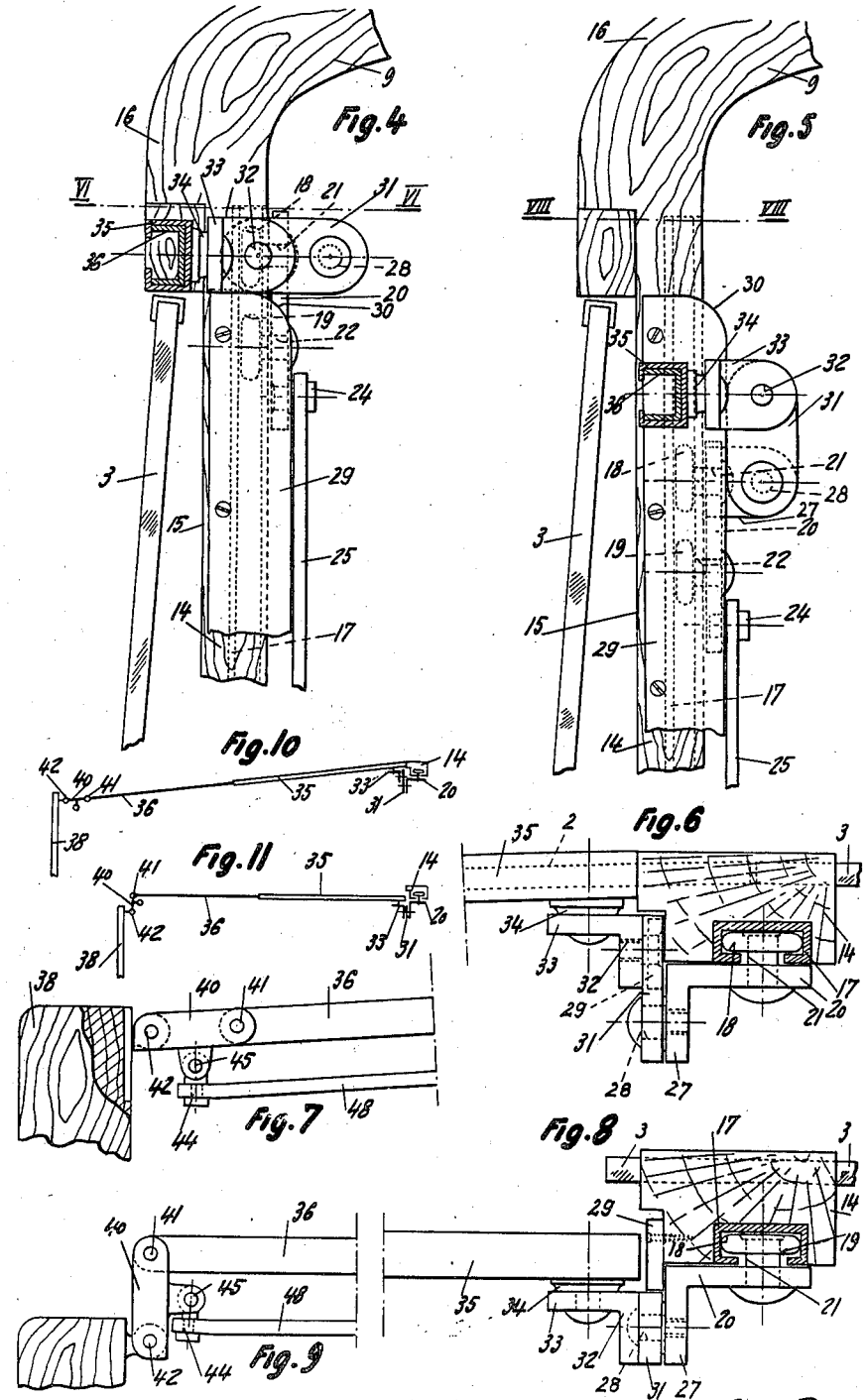
M. Bessonneau
Inventor
By: Glascock Downing & Seebold
Attys May 9, 1939.  M. BESSONNEAU  2,157,783
FOLDING HOOD FOR AUTOMOBILE VEHICLES OR THE LIKE
Filed Nov. 16, 1938  3 Sheets-Sheet 3
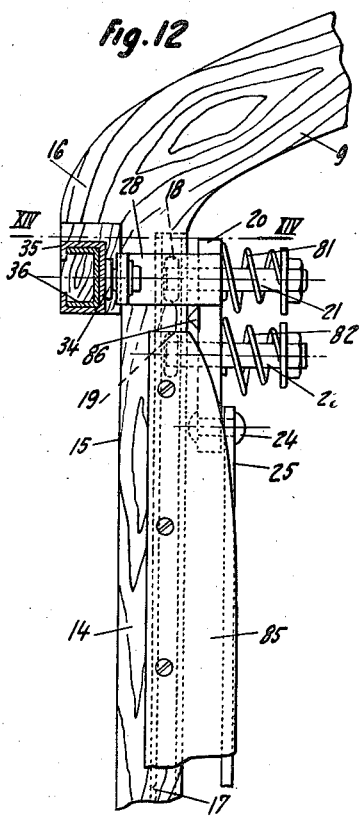
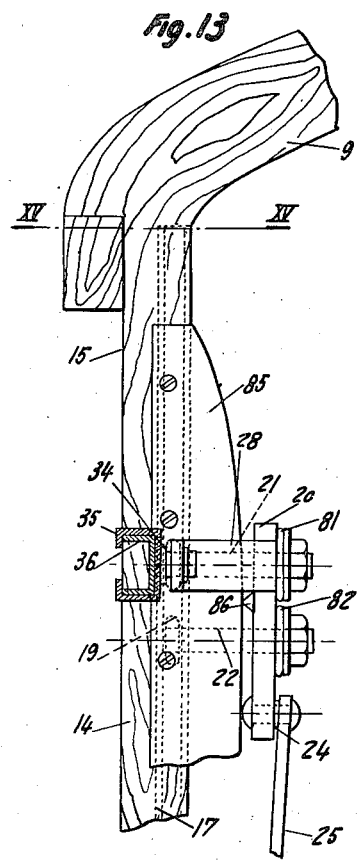
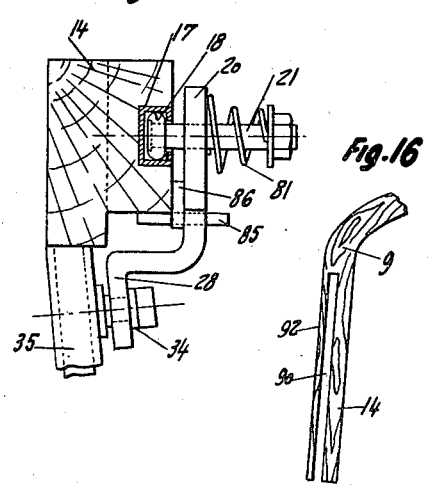
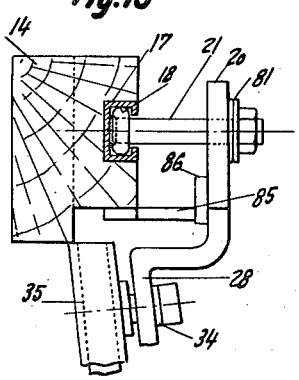
M. Bessonneau
Inventor
By: Glascock Downing Seebold
Attys.

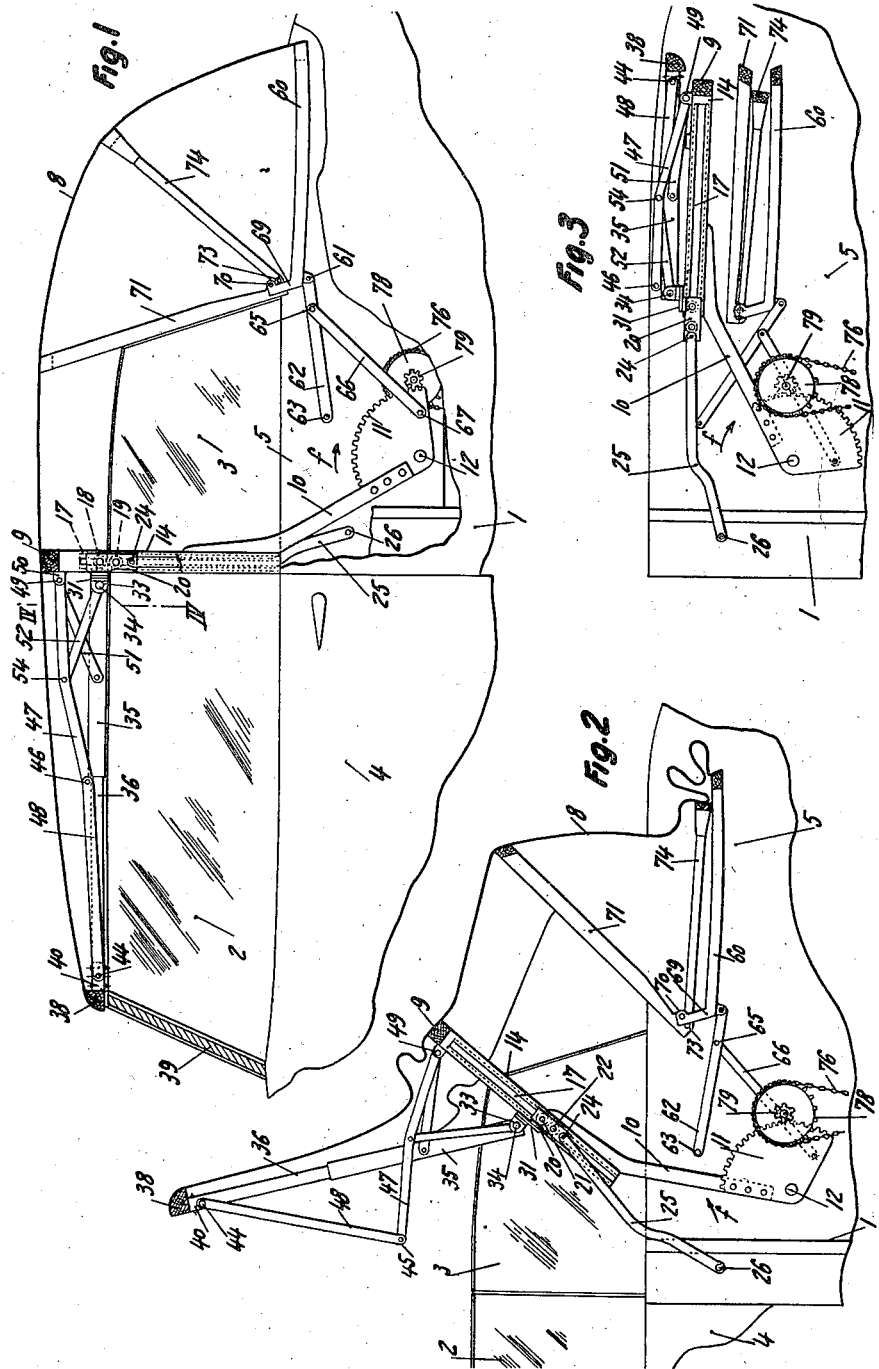
May 9, 1939.  M. BESSONNEAU  2,157,783
FOLDING HOOD FOR AUTOMOBILE VEHICLES OR THE LIKE
Filed Nov. 16, 1938    3 Sheets-Sheet 1

Patented May 9, 1939

2,157,783

UNITED STATES PATENT OFFICE 2,157,783

FOLDING HOOD FOR AUTOMOBILE VEHICLES OR THE LIKE

Maurice Bessonneau, Puteaux, France

Application November 16, 1938, Serial No. 240,846
In France November 20, 1937

14 Claims. (Cl. 296—116)

My invention relates to an automatic folding hood for automobile vehicles or the like and adapted to convert the latter at will into an open car or into a saloon car, and it relates more particularly to the folding hoods of the type described in my co-pending application Serial No. 46,845.

The automatic folding hoods at present in use have no intermediate support between the windscreen which forms the front end and the front hoop of the rear frame of the hood on the perimeter of which is fixed the cloth or the like. Owing to this fact, the space between said hoop and the wind-screen, and which is occupied by a window, has a limited length so that in general the rear seats of vehicles with hoods only offer their occupants a reduced lateral visibility owing to the fact that it is impossible to arrange windows corresponding to such seats and terminating towards the rear of the car as near the back of the rear seats as would be desirable.

On the other hand, the nevertheless relatively great length of certain vehicles having comfortable rear seats between the said front hoop and the wind-screen would make it necessary to construct a complicated, heavy and cumbersome front frame which would frequently quickly become noisy.

The primary object of my invention is the construction of a hood for an automobile vehicle of which the body is provided with windows, said hood offering a satisfactory visibility from the rear seats and not having the drawbacks referred to above.

The hood according to my invention comprises on the one hand a rear frame formed by hoops and which includes a front supporting hoop hinged on the body, and, on the other hand, a front frame carried by said supporting hoop and essentially formed on either side of the body by a longitudinal bar having telescopic elements and a linkage between said bar and said hoop controlling the various folding and unfolding movements and is characterised in that, on the one hand, the aforesaid supporting hoop is mounted on either side of the body for pivotal displacement about a pivot carried by the body and is arranged in such a manner that its arm is, when in the position of use, at the fore of the rear end of the window adjacent to the rear seats of the vehicle and thus forms an intermediate upright, the shape of said hoop and the arrangement of the front frame being such that the pivoting of the whole arrangement for folding is not hindered by said window when in its raised position, and on the other hand the front edge of the cloth forming the rear portion of the hood is secured to a hoop hinged at the rear of said supporting hoop.

This arrangement enables mechanically actuated disappearing hoods to be constructed for bodies having four windows each arm of the hoop being substantially located between the two windows in the open position and advantageously arranged entirely on the inside of the body relatively to said windows of which the frames or the like completely conceal it.

According to an important feature of my invention, the longitudinal telescopic bar is carried by the supporting hoop in such a manner that, when in the position of use, said bar is above the windows and substantially in contact with same so that the cloth covering overlaps the windows when it is unfolded as known and is automatically moved towards the inside of the vehicle at the beginning of the folding movement in order to enable said movement to take place when the windows are in the lifted position without said bar coming into contact with same.

This feature is more particularly applicable to hoods in which the said telescopic bar is mounted so that it can pivot about an axis, which is transverse relatively to the vehicle, on a hinge bracket carried by the supporting hoop through the intermediary of a carriage sliding in a guide-way provided in each of its arms, responsive to an appropriate control which is preferably formed by a lever pivoted on the one hand on said carriage, and on the other hand at a point of the body which is different from the hinge point of said hoop, and consequently reference will be made in the specification solely to hoods of this type.

One embodiment of my invention is intended more particularly but not exclusively for hoods for bodies of which the front tapers and for this purpose the nose-piece of the hood is connected to the end of the longitudinal telescopic bar by an intermediate part on which are pivoted about vertical pivots, said bar, said nose-piece and an extension carrying the pivot pin of the lever of the hinged system controlling the unfolding and the folding.

According to this embodiment, the connection between the carriage sliding along the arm of the supporting hoop and the telescopic bar is effected by means of a connecting rod which is pivoted both on said carriage and on the hinge bracket of the telescopic bar about pins which are parallel with the longitudinal axis of the vehicle, and of which the length corresponds to the necessary movement of said bar perpendicular to the said axis for said bar to be located entirely inside the vehicle relatively to the rear window.

Preferably, said connecting rod engages a guiding cam fixed on the arm of the supporting hoop, said cam being provided with a curved part adapted to positively control the pivoting motion of said connecting rod at least in the direction of displacement of the telescopic bar towards the inside of the vehicle at the beginning of the downward movement of the aforesaid carriage when folding the hood. The pivoting motion of said connecting rod in the other direction takes place automatically under the action of the linkage of the hood, at the end of the unfolding of the latter, in the case in which said intermediate part carrying the nose-piece is provided, and simultaneously with the pivoting of said part.

Another embodiment of my invention consists in fixing the hinge bracket of the telescopic bar on a plate of the carriage adapted when sliding to be moved perpendicular to the longitudinal axis of the vehicle by means of a cam fixed on the arm of the supporting hoop along the guide-way of said carriage and on which a part of said plate is resiliently pressed.

Numerous other embodiments of the control of the lateral displacement of the telescopic bar can moreover be imagined.

Another important feature of my invention relates to the arrangement of the rear frame of the hood which is adapted to be folded automatically responsive to a mechanical control at the same time as the front frame.

According to an embodiment, the rear hoop of the hood on which the rear end of the cloth is fixed is pivoted on either side on a lever which is pivoted on the body and which is suitably inclined to enable said hoop to penetrate into its housing without substantially moving rearwards, said lever moving under the control of another lever pivoted on the former and on the rotary member on which the front supporting hoop is fixed.

Preferably, in order to decrease the overall length of the folded hood, the fixing hoop of the front end of the cloth of the rear end is pivoted on said rear hoop and advantageously carries at the end of an arm projecting from this pivot point, the pivot pin of an intermediate hoop.

Other features and advantages of the invention will moreover become apparent from the ensuing description taken with reference to the accompanying drawings which is given solely by way of example and in which:

Fig. 1 is a partly broken away side view showing the unfolded hood,

Fig. 2 is a view corresponding to Fig. 1 and showing the hood in an intermediate position, Fig. 3 is a view corresponding to Figs. 1 and 2 and showing the hood in its folded position, the waterproof fabric being removed, Fig. 4 is a section on a larger scale along the line IV—IV of Fig. 1, the hinged system for controlling the folding and unfolding being removed together with the front window, Fig. 5 is a similar view to Fig. 4 of the whole arrangement during folding shown in Fig. 2, Fig. 6 is a section along the line VI—VI of Fig. 4, Fig. 7 is a plan view showing the corresponding position of the front part of the frame of the hood, Fig. 8 and Fig. 9 are similar views to Figs. 6 and 7 and correspond to Fig. 5, Fig. 8 being a section along the line VIII—VIII of Fig. 5, Figs. 10 and 11 are diagrammatical views of the arrangement of the parts corresponding respectively to the groups of Figs. 6 and 7, and 8 and 9 respectively, Figs. 12 and 13 are similar views to Figs. 4 and 5 and show a modification, Figs. 14 and 15 are corresponding sections along the lines XIV—XIV and XV—XV of Figs. 12 and 13, Fig. 16 shows a modification of the main supporting hoop.

Reference will be made hereinafter solely to one side of the body and of the hood, the other side being identical.

Referring to Figs. 1 to 11, a hood has been shown for an automatic vehicle body 1 having on each side a front window 2 carried by a door 4 and a rear window 3 intended to ensure visibility for the occupants of the rear seat (not shown), said hood being adapted to be retracted into a housing 5 of U-shaped cross-section surrounding the rear seat.

The hood which is covered with a waterproof fabric 8 has a main supporting hoop 9 fixed by a swan-necked extension 10 on a part 11 mounted on a pivot 12 inside the housing 5.

Said hoop 9 is composed on either side of the vehicle by an arm or upright 14 which, in the position of use (Fig. 1), is vertical and is located between the two windows 2 and 3. The upright 14 has a recess 15 on its outer face (Fig. 4) so that its upper part 16, which is intended to support the cloth 8, slightly overlaps the outer plane of the windows, the height of said recess 15 being sufficient to enable said hoop to rotate about the pivot 12 when the window is in its raised position.

As shown on a larger scale in Figs. 4 and 6 in the recess 15 of the upright 14, which is assumed to be made of wood is lodged a C-shaped metal guide-way 17 parallel with said upright and in which rolls a group of two rollers 18 and 19 of which the pivots 21 and 22, having their axes transverse relatively to the vehicle, support a plate or carriage 20. The plate or carriage 20 carries below the rollers 18 and 19 a pivot 24 having its axis parallel with the axes of said rollers. A lever 25 is pivoted on the one hand on said pivot 24 and on the other hand, inside the housing 5, on a pivot 26 carried by the body and at some distance from the pivot 12.

The plate 20 is provided with a shoulder 27 carrying a pivot 28 the axis of which is parallel with the longitudinal axis of the vehicle and on which is pivoted a connecting rod 31 of suitable length.

The connecting rod 31 engages a guiding cam 29 fixed by screws or the like on the forward face of the arm 14. The guiding edge of the cam 29 comprises a rectilinear part along the arm or upright 14 and parallel with said latter and is terminated slightly below the upper end of the guide-way 17 by a curved part 30 guiding the pivoting motion of the connecting rod 31 about the pivot 28 when the plate or carriage 20 is displaced in the vicinity of said upper end, whereby said connecting rod 31 is displaced either from the horizontal position shown on Fig. 4 to the position shown on Fig. 5 in which it is parallel with the arm 14 or from said latter position to the horizontal position.

The connecting rod 31 carries a pivot 32 parallel with the pivot 28 and on which is mouned an L-shaped hinge-bracket 33. Said hinge bracket 33 carries on its arm which is perpendicular to the one mounted on the pivot 32 a pivot 34 having its axis transverse relatively to the vehicle and on which is mounted the guide portion 35 of a telescopic bar 35—36. Inside this guide bar 35 is mounted a sliding bar 36 the travel of which is limited by a stop. The front end of the sliding bar 36 carries the nose-piece 38 (or transverse front part of the hood intended to rest on top of the wind-screen 39 and on which is fixed the front end of the cloth 8) through the intermediary of a connecting member 40 (Figs. 7 and 9) which is pivoted by means of suitably spaced vertical pivots 41 and 42 on said bar 36 and on the nose-piece 38 respectively.

The front frame of the hood is completed by the hinged control system which is connected with a tail which is terminated by a pivot 44 and hinged by means of a vertical pivot 45 on an extension of the connecting member 40. Said hinged system comprises a group of two levers 47 and 48 which are pivoted on each other by a pivot 46 at one of their ends and of which the other ends are pivoted respectively about axes which are transverse relatively to the vehicle on the tail 44 and on a pivot 49 carried by a lug 50 fixed to the upright 14.

The hinge system as a whole is completed (Fig. 1) by a lever 51 pivoted on the guide-bar 35 and on the upright 14, for example on the pivot 49, and by a lever 52 pivoted on the pivot 34 and on a pivot 54 fixed at an intermediate point of the lever 47.

The rear frame of the hood comprises a hood 60 on which is fixed the rear end of the cloth 8 and is intended to be pressed, in the position of use, against the outer edge of the housing 5 and to penetrate into said housing when the hood is folded.

Said hoop carries a pivot 61 having its axis transverse relatively to the vehicle and on which is pivoted a lever 62 which is itself pivoted by means of a pivot 63 on the body. At an intermediate point of the lever 62 is arranged a pivot pin 65 of a lever 66 which is itself pivoted at its other end on a pivot 67 carried by the actuating quadrant 11.

The end of each arm of the hoop 60 has an upwardly directed extension 69 which carries the hinge pin 70 of an intermediate hoop 71 on which is fixed the end of the cloth 8 forming the rear portion of the hood. Each arm of the hoop 71 is slightly extended below the hinge pin 70 and has at the end of this extension a hinge pin 73 of another intermediate hoop 74.

The whole arrangement is completed by a driving device for the quadrant 11, for example by an electric motor not shown, and by means of a chain 76 and of sprockets 78 and 79.

The U-shaped opening of the housing 5 can be closed by flaps not shown, as described in my co-pending application Serial No. 46,845.

The operation is as follows:

In the position shown in Fig. 1, the hood is unfolded that is to say that the nose-piece 38 rests on the wind screen 39, the bar 35—36 is substantially in contact with the upper edge of the windows 2, the carriage 20 is in its upper position at the upper end of the guideway 17, the intermediate connecting rod 31, as shown in Figs. 4 and 6, is horizontal and the connecting member 40 is in alignment with the bar 36 as shown in Fig. 7.

In other words, the assembly located between the upright 14 and the nose-piece occupies the position shown diagrammatically in plan view in Fig. 10 showing the taper of the body towards the front.

When the member 11 is rotated in the direction of the arrow f, Fig. 1, said member 11 drives the hoop 9, and the carriage 20 is moved downwards along the guide-way 17 by the lever 25, as shown in Fig. 2. During the first part of this movement, on the one hand the levers 47 and 48 pivot about the pivots 49 and 46, and exert a push on the tail 44 causing the connecting member 40 to swing and take up its transverse position shown in Fig. 9, and on the other hand the intermediate connecting rod 31 engages the curved part 30 of the cam 29 and takes up its vertical position. Owing to this fact, the front end of the bar 35—36 has moved away from the longitudinal axis of the vehicle and its rear end has moved towards said axis, so that the whole arrangement occupies the position shown in Fig. 11 in plan view, in Fig. 2 in elevation, and in Fig. 5 in section, the bar 35—36 being substantially parallel with the longitudinal axis of the vehicle. The rear part of the bar 35 is then moved towards the inside of the body relatively to the windows and, as the nose-piece 38 is raised above the window 2, the sliding of the plate 20 along the upright 14 at the same time as the swinging of the hoop 9 can take place up to the position shown in Fig. 3 without closing the windows, the connecting rod 3 sliding along the rectilinear part of the cam 29.

At the same time, the lever 66 swings the lever 62 moving the hoop 60, on which the two hoops 71, 74 fold, towards the inside of the housing 5, the latter hoop without projecting rearwardly with respect to the two others owing to its being hinged on the pivot 73 carried by the extension of the arm of the hoop 71. The whole arrangement then occupies a very small space in the housing 5, as shown in Fig. 3, and said housing can moreover be closed by means of flaps.

For unfolding, the quadrant 11 is rotated in the opposite direction to the arrow f.

When the upright 14 comes into the vicinity of its vertical position, the sliding bar 36 is at the end of its travel within bar 35 which is limited by a stop and the lever 47 pushes the tail 44 and swings the connecting member 40. The lateral displacement of the telescopic bar 35—36 which then takes place positively causes the intermediate connecting rod 31 to swing about the pivot 28 and along the curved part 30 so that the bar 35—36 passes from the position shown in Fig. 11 to the horizontal position shown in Fig. 10. The pull exerted on the strips of fabric connecting the hoops to each other in the usual manner as known, causes the displacement of the rear portion of the hood.

It will be seen that the two operations can take place without being hindered by the windows whether they be in the lowered position or not.

Referring to the modification shown in Figs. 12 to 15, the pivots 21 and 22 of the rollers 18 and 19 mounted in the guide-way 17 provided in the upright 14 of the hoop 9 are extended a length which is at least equal to that of the transverse displacement it is desired to allow the rear end of the bar 35. The plate 20 is slidably mounted on the extensions of said pivots 21 and 22 and is subjected to the action of springs 81 and 82 which urge same in the direction of the upright 14 and of a guide cam 85, similar to the cam 29 described in the above embodiment fixed on the upright 14 and on which the plate is adapted to bear through the intermediary of a projecting part 86 fixed on its surface opposite said cam. The shape of the guide surface of said cam 85 is that of a slope which runs away from the outer surface of the upright 14 by a length equal to the aforesaid transverse displacement and continues up to the lower end of the guide-way 17. The longitudinal bar 35 is mounted directly, through the intermediary of a pivot 34 which is substantially transverse to the vehicle, on an extension 28 of the plate 20.

It will immediately be seen that when the lever 25 moves the plate 20 downwards, said plate moves laterally against the action of the springs 81 and 82 under the influence of the cam 85 up to its position shown in Fig. 13, and at the same time moves the bar 35 towards the inside of the body, so as to enable the folding to be effected without being hindered by the windows. The unfolding is effected in a similar manner.

The remainder of the device is identical with that described with reference to the previous figures.

Finally, in Fig. 16, a modification of the hoop 9 has been shown which, in order to enable folding to be effected without being hindered by the windows, has a slot 90 in the upright 14 for the window 3 to pass and its part 92 is thus outside the windows relatively to the inside of the body when the hood is unfolded.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. In the combination of a folding hood with a vehicle body, a body provided on each side with at least one window, a front supporting hoop each arm of which is mounted on a side of said body for rotation between a rest position in which the intermediate part of said hoop is at the rear of the body and a working position in which said arm is at the fore of the rear end of said window and thus forms an intermediate upright, a front frame including on either side of the body a guiding bar and a further bar in line with said guiding bar and in sliding engagement therewith, a linkage between said bars and said supporting hoop for holding said bars and controlling said latter between the horizontal position in which said bars are above said window and a folded up position, connecting means between the rear end of said guiding bar and said arm adapted to allow said guiding bar to be displaced between a working position in which it is above said window and a further position in which it is laterally displaced to allow the folding of the hood without being hindered by said window.

2. A combination as claimed in claim 1 in which said body is provided on each side with a fore and a rear window and wherein each arm of said supporting hoop is disposed in its working position substantially vertically and between said two side windows.

3. In the combination of a folding hood with a vehicle body, a body provided on each side with at least one window, a front supporting hoop, each arm of which is mounted on a side of said body for rotation between a rest position in which the intermediate part of said hoop is at the rear of said body and a working position in which said arm is at the fore of the rear end of said window and thus forms an intermediate upright, a carriage in engagement with each arm of said supporting hoop and adapted to travel along same, a guiding bar on each side of said body, a further bar carried by said guiding bar and in line and in sliding engagement therewith, a linkage between said bars and said supporting hoop adapted to hold and control said bars, connecting means between the rear end of said guiding bar and said carriage adapted to allow displacement of said guiding bar, when the hoop is unfolded, between a working position in which said bars are substantially above said window and a further position inside of the vehicle with reference to said window and enabling the folding movement to take place.

4. A combination of a folding hood with a vehicle body as claimed in claim 3 including controlling means operatively connected to the position of said carriage and adapted to automatically control the displacement of said guiding bar at least in the direction of the interior of the body during the first part of the corresponding folding stroke of the said carriage.

5. In the combination of a folding hood with a vehicle body, a body provided on each side with at least one window, a front supporting hoop each arm of which is mounted on a side of said body for rotation between a rest position in which the intermediate part of said hoop is at the rear of said body and a working position in which said arm is at the fore of the rear end of said window and forms an intermediate upright, a guide way provided in each of said arms, a carriage in engagement with said guide way and adapted to travel along same, a guiding bar on each side of the body, a further bar carried by said guiding bar and in line and in sliding engagement therewith, a linkage between said bars and said supporting hoop adapted to hold and control said bars, carrying means for the rear end of said guiding member, a connecting rod included in said carrying means for connecting said latter to said carriage, said connecting rod being pivoted on said carriage about an axis fore and aft directed with reference to said vehicle and carrying a further pin, parallel with said axis and connected to said rear end, the distance between said last named pin and axis corresponding to the necessary movement of the rear of said guiding bar to be brought from its working position in which said connecting rod is substantially horizontal to a position in which said guiding bar is inside the body with reference to the window and conversely.

6. A combination as claimed in claim 5 comprising a hinge bracket, included in said carrying means between said guiding bar and said connecting rod, said last named pin being carried by said hinge bracket, a further pin transversally directed with reference to the vehicle and carried by said hinge bracket, said guiding bar being mounted for pivotal movement about said further pin.

7. A combination as claimed in claim 5 including a guide cam carried by said arm, said connecting rod being adapted to engage said guide cam which positively controls at least its motion in the direction corresponding to the folding of the hood, at the upper end of the stroke of the carriage.

8. In the combination of a folding hood with a vehicle body of which the front tapers, a body provided on each side with at least one window, a front supporting hoop each arm of which is mounted on a side of said body for rotation between a rest position in which the intermediate part of said hoop is at the rear of said body and a working position in which said arm is at the fore of the rear end of said window and forms an intermediate upright, a guideway provided in each of said arms, a carriage in engagement with said guide way and adapted to travel along same, a guiding bar on each side of the body, a further bar carried by said guiding bar and in line and in sliding engagement therewith, a stop adapted to limit the extension motion of the whole formed by said guiding and further bars, an end connecting nose-piece, a connecting member pivoted both to said piece and said further arm about substantially vertical axes and adapted to be displaced between a position corresponding to the folded hood and in which it is substantially transversal with reference to the body and a second position in which it is alined with said further arm, a pivot pin carried by said connecting member and substantially transversal with reference to the vehicle, at least one further pivot pin substantially parallel with said last named pivot pin and carried by said supporting hoop, a holding and controlling linkage pivoted to said last named pivot pin adapted to control the motions of said further bar, a hinge bracket, the rear end of said guiding bar being mounted on said hinge bracket for pivotal movement about an axis which is transversal with reference to the vehicle, a connecting rod, the two ends of said connecting rod being respectively pivoted on said carriage and on said hinge bracket about fore and aft directed axes with reference to the vehicle, the distance between said last named axes corresponding to the necessary movement of the rear of said guiding bar to be brought from its working position in which said connecting rod is substantially horizontal to a position in which said guiding bar is inside the body with reference to the window and conversely.

9. A combination as claimed in claim 5 including a guiding cam carried by said arm and adapted to engage said connecting rod thus controlling at least the motion of said connecting rod in the direction corresponding to the folding of the hood, at the upper end of the stroke of the carriage.

10. A combination as claimed in claim 3 in which said arm is provided with a guide way, at least two rollers being carried by said carriage and being adapted to carry the latter.

11. In the combination of a folding hood with a vehicle body, a body provided on each side with at least one window, a front supporting hoop each arm of which is mounted on a side of said body for rotation between a rest position in which the intermediate part of said hoop is at the rear of said body and a working position in which said arm is at the fore of the rear end of said window, and forms an intermediate upright, a guide way provided in each of said arms, a carriage in engagement with the guide way and adapted to travel along same, projecting guiding members substantially transverse with reference to the body and rigid with said carriage, a plate member carried by said projecting members for movement along same, a cam member carried by said arm and adapted to be resiliently engaged by said plate and to displace said latter along said projecting members at the end of the unfolding motion of the hood and conversely at the beginning of the folding motion, and a front frame carried by said plate for supporting the forward part of the hood.

12. In the combination of a folding hood with a vehicle body the rear part of which is provided with a recess adapted to contain the folded hood and which is provided on each side with at least one window, a front supporting hoop each arm of which is mounted on a side of said body for rotation about an axis disposed within said recess between a rest position and a working position in which said arm is at the fore of the rear end of said window, a member rigid with the part of said arm disposed within said recess, a connecting rod pivoted within said recess, a further connecting rod pivoted both to said last named connecting rod and to said member, a rear hoop adapted to carry the rear portion of the covering piece and pivoted at the end of said first named connecting rod, thus enabling said hoop to penetrate in said recess without substantially rearward movement.

13. A combination as claimed in claim 12 including projecting parts rigid with the arm of said rear hoop and a further hoop pivoted at the end of said parts and adapted to carry the front end of the rear portion of the covering piece.

14. A combination as claimed in claim 12 including projecting parts rigid with the arm of said rear hoop and a further hoop pivoted at the end of said parts and adapted to carry the front end of the rear portion of the covering piece, a projection rigid with the arms of said further hoop and a still further hoop pivoted at the end of said projection.

MAURICE BESSONNEAU.